(12) United States Patent
Meksvanh et al.

(10) Patent No.: US 7,472,548 B2
(45) Date of Patent: Jan. 6, 2009

(54) SOLAR AUGMENTED GEOTHERMAL ENERGY

(76) Inventors: Sovani Meksvanh, 2635 Holman Ave., Silver Spring, MD (US) 20910; Ronald P. Whelan, 8108 Inverness Ridge Rd., Potomac, MD (US) 20854; Douglas B. Swift, 2823 Moss Ave., Midland, TX (US) 79705

( * ) Notice: Subject to any disclaimer, the term of this patent is extended or adjusted under 35 U.S.C. 154(b) by 441 days.

(21) Appl. No.: 11/220,391

(22) Filed: Sep. 7, 2005

(65) Prior Publication Data

US 2006/0048770 A1 Mar. 9, 2006

Related U.S. Application Data

(60) Provisional application No. 60/607,970, filed on Sep. 8, 2004.

(51) Int. Cl.
*F03G 7/00* (2006.01)
*B60K 16/00* (2006.01)

(52) U.S. Cl. ..................... 60/641.2; 60/641.8

(58) Field of Classification Search ..... 60/641.2–641.4, 60/641.8–641.15
See application file for complete search history.

(56) References Cited

U.S. PATENT DOCUMENTS

| | | | |
|---|---|---|---|
| 3,931,851 A | 1/1976 | Harris et al. | |
| 4,211,613 A | 7/1980 | Meckler | |
| 4,513,733 A | 4/1985 | Braun | |
| 4,818,370 A | 4/1989 | Gregoli et al. | |
| 4,824,447 A | 4/1989 | Goldsberry | |
| 5,058,675 A | 10/1991 | Travis | |
| 6,668,554 B1* | 12/2003 | Brown | 60/641.2 |
| 2007/0223999 A1* | 9/2007 | Curlett | 405/55 |

FOREIGN PATENT DOCUMENTS

| | | |
|---|---|---|
| CA | 2208046 | 1/1999 |
| CN | 1215790 | 5/1999 |
| CN | 1254053 | 5/2000 |
| JP | 2002263634 | 9/2002 |

OTHER PUBLICATIONS

Swift, Sr., Douglas B., , "State of the Oil and Gas Industry,", Railroad Commission of Texas, http:www.rrc.state.tx.us/whatsnew/soi/swift.html, pp. 2, (Jul. 19, 2000).

(Continued)

*Primary Examiner*—Hoang M Nguyen
(74) *Attorney, Agent, or Firm*—Barnes & Thornburg LLP

(57) ABSTRACT

An apparatus and a method is disclosed for storage of solar energy in a subsurface geologic reservoir. The method includes transferring concentrated solar thermal energy to a fluid, thereby generating a supercritical fluid. The supercritical fluid is then injected into the subsurface geologic reservoir through at least one injection well. The subsurface geologic reservoir may be a highly permeable and porous sedimentary strata, a depleted hydrocarbon field, a depleting hydrocarbon field, a depleted oil field, a depleting oil field, a depleted gas field, or a depleting gas field. Once charged with the supercritical fluid, the subsurface geologic formation forms a synthetic geothermal reservoir.

42 Claims, 2 Drawing Sheets

OTHER PUBLICATIONS

Swift, Douglas B. and Erdlac, Jr., R, , "Geothermal Energy Overview and Deep Permeable Strata Geothermal Energy (DPSGE) Resources in the Permian Basin,", The Permian Basin: Providing Energy for America, West Texas Geological Society Publ., No. 106, pp. 113-118, (1999).

Swift, Douglas B, et al., "Proposed Thermal Model for Deep Fresh Water in the Val Verde and Delaware Basins,", AAPG SWS Convention, Transactions and Abstracts, pp. 148, (1998).

Examination Report for European Patent Application No. EP 05 794 191.6 dated Nov. 3, 2008.

* cited by examiner

SOLAR AUGMENTED GEOTHERMAL ENERGY

CROSS-REFERENCE TO RELATED APPLICATIONS

This Non-Provisional U.S. Patent Application relies for priority on U.S. Provisional Patent Application Ser. No. 60/607,970, which was filed on Sep. 8, 2004, the contents of which are incorporated herein by reference in its entirety.

BACKGROUND OF THE INVENTION

1. Field of the Invention

The present invention relates to a method and apparatus for storage of solar energy within an artificial or synthetic geothermal environment. The present invention also relates to the creation and utilization of thermal reservoirs for the synthetic geothermal storage of solar energy, to secondary and tertiary oil recovery, and to the use of those thermal reservoirs for water distillation and continual, or sustained, energy production.

2. Description of the Related Art

Various methods of the production of energy from solar energy are known. In connection with the production of energy from the sun, methods have been developed to concentrate solar heat. These methods include solar flux furnaces (1,000° C. to 5,500° C.), solar towers (400° C. to 1,100° C.), and solar trough technologies (100° C. to nearly 550° C.), all of which are known in the prior art.

One difficulty associated with reliance on solar energy is the variability associated with this type of energy production. As those skilled in the art will readily appreciate, solar energy is dependent upon daylight time, variable cloud conditions and seasonal solar incidence. For this reason, solar energy cannot be relied upon to deliver base load or peak load electrical power.

With respect to the recovery of oil and gas from oil and gas fields, these fields typically are found in porous and permeable reservoir beds. Initial recovery rates of only 30% of oil from oil fields are common. In order to recover the remaining 70% of the oil fuels from these reservoirs, it is often necessary to rely on secondary or tertiary recovery efforts.

One type of secondary or tertiary recovery method that has been developed involves steam injection methods for enhanced recovery of hydrocarbons. In this methodology, steam is introduced (called "steam flooding") into, for example, an oil reservoir to draw (or force) the oil residuals from the reservoir in which they are located. Steam flooding is considered to be one of the most efficient methods of secondary or tertiary oil recovery.

One problem associated with steam flooding is the creation of the steam required for the process. As would be appreciated by those skilled in the art, the cost of steam generation is quite high. In addition, the steam front introduced into a reservoir initially experiences significant cooling due to heat absorbed by the host rock (i.e., the rock forming the hydrocarbon reservoir). Accordingly, steam flooding is usually limited to low viscosity (i.e., 18 gravity and below) oil deposits in small (i.e., 10 acres or less per well) pro-ration unit fields.

Since steam generation is very cost intensive, requiring significant amounts of natural gas or liquid hydrocarbon combustion to generate the steam, steam flooding of large pro-ration fields (i.e., greater than 20 acres per well) has not been relied upon widely. Simply, the heat lost to the reservoir strata and resultant ineffective thermal drive has been prohibitive to the application of steam flooding under these circumstances.

One benefit of long-term steam flooding in a large pro-ration unit field is the enhanced ultimate recovery of hydrocarbons from the field. However, as noted above, the cost associated with long term steam flooding does not support the use of this method for application to large pro-ration unit fields.

It is also known to use hyper-saline water (brine) to extract residual hydrocarbons from reservoirs. This is known as "water flooding" to distinguish it from steam flooding. Produced hyper-saline water ("water cut") is a common by-product of oil production. The water cut, which may be considered as "waste water" depending on its chemical composition, routinely is re-injected into porous and permeable strata of non-producing wells (water disposal wells) or is utilized as a driving agent in secondary and tertiary oil field recovery projects. A significant problem with the use of waste water is that waste water is considered an environmental hazard. As a hazard, its disposal is regulated. Moreover, spills of brine waste water require remediation. State and Federal environmental codes mandate approved disposal methods and techniques.

Various methods are known for extracting heat from naturally-occurring geothermal reservoirs. These methods rely upon natural thermally charged igneous sources of geothermal energy. In other words, these sources extract geothermal heat from geothermal sources, or other thermal uses known to those skilled in the art, and convert it into electrical energy.

The concept of extracting heat from deep permeable strata in existing, but depleted, gas reservoirs also has been proposed. (Swift and Erdlac, 1999.) In particular, it has been proposed to introduce water into deep permeable strata to heat the water into steam, which can be used for electrical power generation.

As would be appreciated by those skilled in the art, geothermal production of electricity has been limited to igneous terrains. Permeability of the igneous terrains and a lack of water resources have presented significant obstacles to this type of energy production. Insufficient permeability has proved a particular difficulty in hot dry rock technology where rock with a low thermal conductivity immediately adjacent to induced fracture surfaces is rapidly depleted of its thermal charge.

Heat budget management has also proven a problem in geothermal projects. The capacity to extract heat from a geothermal source often exceeds the natural heat flow within the rocks, resulting in decreased plant efficiency and extinction of associated hydrothermal phenomenon, such as geysers and hot springs. Once a natural geothermal reservoir has been identified, production wells are drilled to extract the geothermal/hydrothermal energy.

Water is used to carry thermal energy out of the reservoir, either through flow of natural hydrothermal reserves or by pumping water into the reservoir through injection wells, circulating the fluid through the reservoir to extraction bore holes. The water flows through the permeable strata, is heated by contact with the hot rock, and then is used to transfer the geothermal heat to the surface, flowing upward through one or more production wells in a pressurized, closed-loop circulating operation, referred to as heat mining.

At the surface, the heat contained in the circulating geothermal fluid is either flashed to steam, directly driving turbines, or is transferred to a second fluid (referred to as a binary working fluid) in a high-pressure heat exchanger of conventional design. Then, the cooled geothermal fluid is re-injected into the geothermal reservoir to be reheated. The second fluid is commonly ammonia, or a mixture of low molecular weight hydrocarbons, such as isobutane ($C_4H_{10}$) or isopentane ($C_5H_{12}$).

Even though the hot pressurized geothermal fluid is relatively benign from a chemical perspective, flashing geothermal fluid into steam at the surface can result in a release to the environment of small amounts of environmentally undesirable dissolved materials such as hydrogen sulfide, boron, arsenic, selenium, mercury, lead, and other trace elements and compounds, which are common to and occur naturally in the igneous or metamorphic host rock.

Equally significant, quantities of silica, chlorides, and carbonates are also typically dissolved in the aqueous geothermal fluid, potentially causing corrosion and undesirable deposits (i.e., scale) on turbine blades and other metallic surfaces in power plants and in heat exchangers.

Water-based geothermal systems generally have a geochemically determined, temperature limit controlled by the critical point of water (374° C. and 22 MPa).

As the critical point for water is reached and then surpassed, the enhanced dissolution of silica, followed by retrograde precipitation below 374° C. and 22 MPa, presents a substantial obstacle to operating an igneous geothermal reservoir at higher than the critical temperature. Moreover, these reservoirs occur most commonly in igneous and metamorphic rocks, where silica is present as either a primary or secondary (i.e., fracture filling) mineral. The silica dissolution and re-precipitation problem occurs as the critical temperature for water is passed.

Although drilling systems are capable of reaching rock temperatures in excess of 400° C., concerns about enhanced geothermal interactions arise in water based igneous geothermal energy systems at these temperatures. Specifically, scaling becomes a considerable concern for these environments.

Scaling problems are much reduced in the sedimentary strata encountered in oil provinces. The oil industry has developed methods and technologies to minimize and/or control scaling problems.

In summary, the prior art associated with the production of electricity from solar energy, geothermal energy, and hydrocarbon combustion present specific problems that are, as yet, unaddressed.

There is still a great need for improved methods of delivering low cost live (supercritical) steam for efficient secondary and tertiary hydrocarbon recovery programs, for producing and storing solar energy, and for producing and storing geothermal energy.

SUMMARY OF THE INVENTION

It is, therefore, one aspect of the present invention to provide solutions to one or more of the problems faced in connection with solar energy production, geothermal energy production, and the production of low cost supercritical (a.k.a., "live") steam for efficient secondary and tertiary hydrocarbon recovery programs.

It is still another aspect of the present invention to provide an economic use for super-saturated waste brines produced ancillary to the production and/or recovery of hydrocarbons.

One additional aspect of the present invention is to provide a method for the production, storage, and subsequent mining of solar energy.

A further aspect of the present invention is to provide a method for the production, storage, and subsequent mining of augmented geothermal energy.

Still another aspect of the present invention is to provide a method of expanding the terrain traditionally targeted for geothermal electrical energy development to include sedimentary rock formations, in which supercritical fluids may be stored.

A further aspect of the present invention contemplates the conversion of depleting and depleted oil and gas fields, with their bore holes and infrastructure intact, into solar energy storage facilities.

To achieve one or more of the foregoing aspects, the present invention provides for the storage of solar energy as synthetic geothermal energy in porous and permeable subsurface reservoirs.

The present invention also provides for the stimulation of existing oil reservoirs to maximize oil production.

The present invention also provides for the in situ fracturing of hydrocarbon molecules to increase the value of those hydrocarbons and their flow rates.

The present invention provides for the production of energy using existing oil and gas fields, whether depleted or not, accessed through existing bore holes.

The present invention also provides for the use and disposal of oil field brine, potentially utilizing that brine as a source of fresh water.

An additional aspect of the present invention is to provide a method of producing, for long periods of time, a reliable water source for large regions in the United States and abroad.

Further aspects of the present invention are set forth in the drawings and description that follow or will become apparent to those skilled in the art upon examination of the discussion of the present invention. The aspects of the present invention may be realized and attained by means of the instrumentalities and combinations set forth in the claims appended hereto and equivalents thereof.

BRIEF DESCRIPTION OF THE DRAWINGS

The present invention is described in connection with the drawings appended hereto.

DESCRIPTION OF EMBODIMENT(S) OF THE INVENTION

Figure 1:
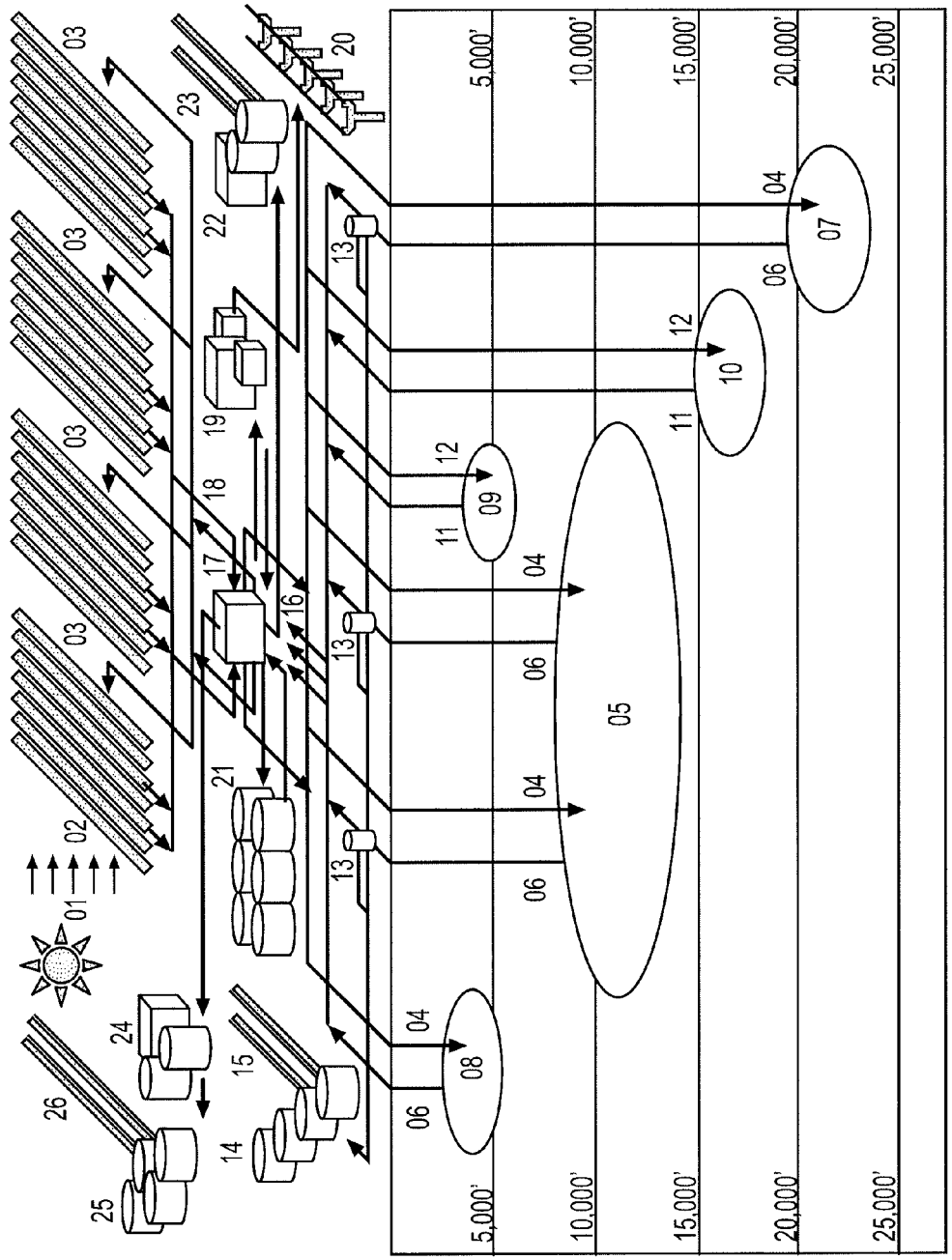
FIG. 1 is a schematic diagram of embodiment(s) of the apparatus of the present invention, indicating various subsurface depths associated with different energy extraction methodologies.

Details of the present invention will now be described in connection with the drawings appended hereto and the embodiments described herein. As would be appreciated by those skilled in the art, the details of the present invention that are discussed herein are not meant to be limiting of the present invention. To the contrary, the examples are meant to be illustrative of the breadth and scope of the present invention. Moreover, equivalents of the embodiments described herein are expressly intended to be encompassed by the claims appended hereto.

From a high-level perspective, the present invention concerns an interdisciplinary approach to the production of energy from solar, geothermal, and hydrocarbon-based sources. The present invention contemplates a synergy between various aspects of the technologies associated with the production of energy from these three sources. The present invention seeks to capitalize on those aspects of energy production from one source that may be used in conjunction with another source, as more fully discussed herein.

In one example, it is contemplated that the capture of solar energy may be used in combination with the recovery of hydrocarbons from traditional oil and gas wells using the existing infrastructure associated with those wells.

As discussed above, steam flooding of oil reservoirs may be highly efficient and effective in recovering otherwise non-producible hydrocarbons from those reservoirs. However, as noted, the high cost of steam production has hindered extensive use of this technology especially in connection with larger-sized reservoirs (i.e., those greater than 20 acres in size).

In one embodiment, the present invention relies upon solar energy utilizing Concentrating Solar Power ("CSP") technology to generate a supercritical fluid. A supercritical fluid is one where, among other properties, the fluid remains in a liquid state despite the fact that the temperature of the fluid exceeds that of the boiling point of the fluid. For purposes of the present invention, the supercritical fluid preferably is a brine solution but other compositions of the supercritical fluid are also contemplated to fall within the scope of the invention.

The present invention preferably relies on the type of brine solution used for the recovery of oil from oil fields. The brine solution may be of the type traditionally injected in secondary and tertiary hydrocarbon recovery projects. As discussed herein, the same solution employed for such projects provides a source of both electrical power for the oil field and a source of fresh water.

One aspect of the present invention recognizes that thermal reservoirs may be created by pumping supercritical brines into existing porous and permeable reservoirs through existing and/or new well bores. Once charged with supercritical brine, the reservoirs become a thermal storage facility that may be continually (i.e., 24 hours a day) tapped to remove the energy stored therein.

In one contemplated embodiment, solar energy may be captured and stored in the brine solution, which is then stored in the reservoir. This embodiment is referred to herein as a hybrid solar/geothermal vector. After being stored, the supercritical fluids may be pumped out of the reservoir, as needed, for electrical power generation and/or fresh water distillation. The supercritical fluids may be circulated from the reservoir and back, as needed.

It is contemplated that this embodiment of the invention will work well in fields that are not yet depleted of hydrocarbons and in fields that have been depleted of hydrocarbons. It is also contemplated that the use of existing well infrastructure, such as existing well bores, will significantly reduce the cost of converting depleted fields into power generation sites.

It is contemplated that solar energy will be used to superheat the brine solution, possibly via a CSP facility, until the temperature of the brine is above the critical point of water, which is at 374° C. Of course, other temperatures are also contemplated to fall within the scope of the invention.

To minimize heat loss to the bedrock, a thermally insulated casing may be employed.

Since supercritical brine will be introduced into the reservoir, the supercritical brine provides a vehicle for the removal of residual hydrocarbons. If the temperature is high enough, the supercritical brine may not only assist in the extraction of residual hydrocarbons, but the supercritical brine may also fracture hydrocarbons with a high molecular weight. This, of course, depends on the temperature of the superheated brine and specific oils found in the oil field.

It is contemplated that a pattern of multiple injector wells will be necessary for most oil fields to extract most of the hydrocarbons from the field. With multiple wells (or bores), the steam may be introduced in one bore, permitting extraction of hydrocarbons from a different wells situated ahead of the steam front.

With extended exposure to a steam front, the residual hydrocarbons in the oil field are expected to become increasingly depleted. Once all of the residual hydrocarbons are removed, the usage of the reservoir will be completely converted to synthetic geothermal power generation and/or water distillation, including brine desalination and distillation.

As may be appreciated by those skilled in the art, the steam front will expand as the temperature in the reservoir reaches an equilibrium. As the steam front progresses through the reservoir, the manner in which the reservoir is used may be altered. It is contemplated, for example, that additional thermal extraction facilities may be added to extract thermal energy from more than one point over the reservoir. Also, binary cycle electric generation facilities may be added, which may include binary cycle geothermal power plants, to generate electricity. In addition, distillation facilities, such as brine desalination and distillation facilities, also may be added to the system to produce a continuous supply of fresh, potable water. The stored thermal energy in the reservoir may be used to augment the synthetic geothermal energy and water distillation components of the system, among others.

Depleted gas reservoirs may be placed into production for power production and fresh water distillation immediately or at least with minimal modification. Small abandoned gas fields are expected to offer the best opportunities for pressure maintenance, minimizing costs.

For the invention, it is preferred that injection zones be positioned in rock with established permeability and porosity, through existing well bores that have been properly lined, as previously discussed. As such, it is contemplated that the supercritical fluid may be introduced into the reservoir through the existing well bores. Surrounding rock beds, due to the poor conductivity of most rock, are expected to serve as insulation, restricting and/or confining the thermal assets to the targeted geological strata.

As would be appreciated by those skilled in the art, binary cycle electric generation facilities, such as geothermal power plants, work most efficiently in the 120° C. to 160° C. temperature range. The invention contemplates several scenarios for the storage of thermal energy. In one possible configuration, large thermal high temperature reserves may be created. Alternatively, the temperature of the thermal reserve may be specifically tuned to allow for the most efficient brine temperatures at the extraction point.

Of course, as would be appreciated by those skilled in the art, deep gas fields will have their own geothermal component. Many fields with a reservoir depth below 4,572.0 meters (15,000 feet) have bottom hole temperatures in the 120-180° C. range. Therefore, deep reservoirs may take advantage of the heat from the earth to maintain the thermal reservoir at the design temperature. Preferably, deep reservoirs will have a depth of greater than 4,267.2 meters (14,000 feet) below the ground surface. Reservoirs that are more than about 4,267.2 meters (14,000 feet) deep benefit from the natural heat from the earth and, therefore, facilitate raising the temperature of the brine to the point where is it possible to crack hydrocarbons in situ. For reservoirs greater than 7,010.4 meters (23,000 feet), temperatures may be reached that provide additional advantages. However, in reservoirs that are much deeper than 7,010.4 meters (23,000 feet), the earth's heat will turn the hydrocarbon deposits into carbon (graphite).

It is noted that, while deep fields offer the additional advantage of natural geothermal energy, shallow fields (i.e., up to 304.8 meters (1,000 feet deep)) also may be used. These fields may present the additional advantage of uniform extraction to meet base load and/or peak load demands.

The high cost of drilling wells that are associated with standard geothermal development are avoided by the present invention, since it contemplates the utilization of the existing wells in the oil and gas fields of the world. Due to rock property differences and different hazards associated with geothermal development over hydrocarbon development, oil industry wells typically cost one quarter (¼) the cost of a comparable-depth geothermal well.

It is also contemplated that reliance upon existing well bores will further significantly reduce the cost associated with the conversion of a reservoir to use with the invention. At present, as wells are depleted, they must be plugged and are deemed of little future value. In other words, a depleted well is a financial liability. The invention contemplates converting this financial liability into an asset that may assist with the storage of a renewable energy asset.

As indicated above, higher reservoir temperatures encountered in deep depleted gas fields will assist the facilities of the present invention. However, deeper reservoirs are not needed to practice the present invention, because the preferred embodiment of the system relies on solar energy to create the thermal store. Of course, it is recognized that the daily solar budget for a particular area will constrain the thermal production of a particular plant location. Despite this, oil reservoirs, even at higher latitudes where solar availability is reduced by comparison with their lower latitude counterparts, may be converted effectively to thermal energy stores.

To pump the hyper-saline brine from the solar facility (i.e., a CSP facility) to the reservoir, it is contemplated that positive displacement or circulation pumps will be used. However, these pumps are meant to be exemplary only. As would be appreciated by those skilled in the art, other types of pumps may be employed. Moreover, it is also contemplated that the terrain of a particular location may be used to circulate the hyper-saline brine to and from the reservoir (i.e., by using the force of gravity).

To minimize heat losses during the transportation of the supercritical brine from the solar facility to the reservoir and back, the piping preferably is insulated. The well bore also preferably is insulated, as needed, to minimize heat losses and maximize the thermal retention of the store.

As should be appreciated by those skilled in the art, the injection period will last the productive life of the thermal field. To control the temperature of the subsurface thermal reserve, the injection rate into the reserve may be varied. As should be apparent to those skilled in the art, during sunny days, the injection flow will add to the thermal reserve. On inclement weather days, the brine may be extracted from the thermal reserve to be used in the production of electricity. Down days due to facility maintenance or inclement weather will be balanced by intervals of high sunlight, resulting in a continued and uninterrupted stream of supercritical fluid to the extraction wells and thence, to the power and distillation facilities.

It is preferred that pumping rates in the range from about 16,000 to 3,180,000 liters per day (or 100-20,000 barrels of water per day ("BWPD")), based on average sized binary cycle power plant, will carry sufficient heat to run a commercial multi-megawatts binary cycle electrical power facility. Those rates are well established in the geothermal industry, with readily available commercial equipment. Surface pumping pressures in the range from about 3.4 MPa (500 psi) to about 58.6 MPa (8,500 psi) conform to known bottom hole pressures for most formations within targeted depth ranges, and will not seriously fracture the rock or drive the thermal front beyond the limits of the existing oil or gas reservoir. Brines heated by the CSP facility will have an associated pressure increase, significantly supplementing pumping requirements.

Industry studies in the tar fields of California have demonstrated that a relatively low temperature live steam front will effectively steam clean the reservoir, leaving behind little or no residual oil.

Flash facilities at the geothermal field at the Salton Sea, utilizing brines with a salt content in the 170,000 to 180,000 parts per million (ppm) range, were able to produce, after flashing, residual water with a salt content in the 80 parts per million (ppm) range. This is sufficiently fresh for human consumption. Fresh water generated by the methods of the present invention are predicted to be of a quality sufficient for industrial use or agricultural use. Depending upon the reservoir, the water may be of sufficient purity and quality for human consumption.

Since the present invention contemplates the use of oil field brines that may be converted into at least industrial-grade water, the present invention offers the additional advantage of converting an environmentally hazardous waste into a useable commodity.

It is contemplated that the present invention is well-suited for use in the Southwestern United States. That region benefits from an abundant solar budget, virtually inexhaustible supplies of brine water, and large oil and gas fields. Since fresh water is scarce in this region of the United States, it is contemplated that the conversion of existing oils and gas reservoirs to use as thermal reservoirs for use with the present invention may provide a ready source of fresh water. In other words, the application of the present invention, which relies upon existing resources in the Southwestern U.S. can be used to supply a critically needed resource—fresh water.

For the present invention, brines are the preferred subsurface circulation fluid because of their high capacity to absorb and carry heat. Since most of the oil and gas producing formations in the United States were deposited in marine environments, the water trapped in those formations generally contain salt with a concentration in a range from 30,000 to 240,000 parts per million (ppm). The present invention may be used to dispose of that brine by converting it to fresh water. Alternatively, the present invention may use the existing brine as a source of the brine solution required for the capture and storage of solar heat. It is expected that the cost of pumping existing brine water from a reservoir into the storage facility of the present invention will be offset by the electrical power generated at the site.

As discussed above, scale is a problem with geothermal energy production. Accordingly, the present invention contemplates that scale-control additives may be incorporated into the supercritical fluid before their introduction into the injection bore hole. Alternatively, scale-control additives may be added to the circulating fluid in any convenient location in the closed-loop system. Other additives may be employed to inhibit corrosion, degradation, and wear of casing, piping, pumping equipment, and power generation plant equipment, such as heat exchangers.

It is contemplated that the primary category of precipitates that will be encountered are carbonates. Problems with calcium carbonate scale and calcium sulfate scale have been successfully overcome by oil and gas industry using standard technologies, which may be employed here. In addition, reliance on binary power systems will minimize environmental impact. Because the present invention utilizes sedimentary reservoirs such as oil and gas fields for thermal storage, virtually none of the toxic metals associated with igneous geothermal development (lead, mercury, arsenic, selenium) will be produced.

During secondary and tertiary hydrocarbon recovery, hydrocarbons may be captured at the extraction well point through standard industry technology presently in use in conventional water or $CO_2$ flooding projects. Catalytic additives will enhance the hydrocarbon fracturing potential of the steam front, resulting in a first phase in situ refining of the produced oil, thereby enhancing the value of the produced petroleum.

Once the hydrocarbon field has been depleted and converted to electrical production in accordance with the present invention, further processing techniques may be employed to strip residual methane and other hydrocarbons from the supercritical fluid stream. Separation of the hydrocarbons from the supercritical fluid can be accomplished using any conventional method such as separation with propylene carbonate membranes, standard gun barrel separators, or by chilling the mixture to distill out the hydrocarbons.

For production of thermal energy from the thermal reservoir constructed in accordance with the present invention, it is preferred that one or more field wells be converted to injection wells. This preferably includes the installation of thermal casing, as appropriate. Coupled with conversion of a sufficient number of extraction wells to supply the binary plant (MW dependent) with its required brine stream, the thermal casing may be used to increase system efficiency.

As indicated above, it is an aspect of the present invention to use the existing oil industry infrastructure to increase energy production and also to provide for the production of fresh water, where appropriate. Specifically, as indicated, it is one aspect of the present invention to provide a method and apparatus that permits the oil industry to convert a wasted asset (i.e., a depleted hydrocarbon reservoir) into an energy-producing asset.

The present invention also contemplates facilities that electrolyze water to produce hydrogen and oxygen. Since it is an aspect of the present invention to utilize the existing infrastructure associated with hydrocarbon production, in one preferred embodiment, the pipeline infrastructure associated with the reservoir may be used to transport the hydrogen and oxygen to a market location or to storage.

The apparatus of the present invention will now be discussed in connection with FIG. 1. In the schematic of FIG. 1, the sun 1 emits radiant energy 2 which is captured by solar energy technology 3. The solar energy technology 3 preferably is CSP technology. As illustrated, the preferred CSP technology is a series of solar parabolic troughs 3. As would be appreciated by those skilled in the art, however, any solar technology permitting the creation of a heated fluid, preferably a supercritical fluid, may be employed, without departing from the scope of the present invention.

As shown in FIG. 1, the solar parabolic troughs 3 generate heat by focusing the sun's energy onto pipes through which a fluid is circulated. The solar parabolic troughs 3 preferably heat the fluid to approximately 390° C. Of course, as would be appreciated by those skilled in the art, the temperature need not be 390° C., but may be varied according to the particulars of the system being employed.

The system preferably provides for great flexibility to control the injection temperature within narrow thermal windows. As discussed above, by varying the CSP technology, temperature ranges from as low as 100° C. to over 3,500° C. are achievable. The thermal energy captured from the sun heats brine to supercritical temperatures. The brine is then pumped into one or more injector wells 4. The injection wells 4 can either be existing hydrocarbon wells worked over for injection purposes or new wells drilled specifically for purposes of the present invention.

The supercritical brine then enters the porous and permeable reservoir 5 in accordance with the present invention, either through existing or enhanced casing perforations or through an open hole, below a thermal packer. In a typical secondary or tertiary hydrocarbon recovery process, live steam is pumped into the reservoir 5 through the injection sites 4, and proceeds through the oil reservoir 5 to the lower pressure sump around the extraction wells 6. In the process, the live steam will push fluid hydrocarbons, and entrain previously unrecoverable hydrocarbons to the extraction wells 6.

When the present invention is applied to power generation or water distillation, including brine desalination and distillation, the present invention can rely on most existing porous and permeable trap reservoirs, whether oil producing or not. Depleted gas fields 7 or non-hydrocarbon reservoirs 8 can utilize the synthetic geothermal storage banks of the present invention. Where sufficient water supplies are available, the present invention can also be used to thermally recharge existing non-hydrocarbon reservoirs 8. These configurations make use of existing or specifically drilled injection wells 4 and extraction wells 6, as in the tertiary oil recovery configuration of the present invention.

Sufficient supercritical fluid is injected into the well 4 to re-pressurize the reservoir 5, to establish circulation from injector to extraction wells 6, and to compensate for supercritical fluid diffusing into the rock mass surrounding the reservoir region. As should be apparent, the volume of fluid needed depends upon specific field parameters including, but not limited to, trap aerial extent, pay thickness, porosity, and permeability. The supercritical fluid preferably consists of an oil field disposal brine and/or a formation brine extracted from water bearing zones in adjacent abandoned wells, which are specifically mined for their brine supply.

In FIG. 1, brine supply reservoirs 9, 10 are shown in strata both above and below the reservoir 5. Brine extraction wells 11 supply the system with operating fluid. While it is preferred to extract brine from wells 9, 10 adjacent to the reservoir 5, this is not required to practice the present invention. The operating fluid may be surplus water or, alternatively, may be residual water requiring disposal. Excess operating fluid or waste from the operating fluid may be re-injected through the brine injection wells 12 into the brine supply reservoirs 9, 10.

In the preferred embodiment of the present invention, in connection with the generation of electrical energy from the brine circulating in the system of the present invention, it is preferred that the brine be circulated from the reservoir 5 to the power generating facility 17 (i.e., the heat exchange complex) and back to the reservoir 5. Where the present invention includes a distillation module 24, such as a brine desalination and distillation module, to produce fresh water from the brine, it is preferred that the waste water from the distillation process not be returned to the reservoir 5 because the buildup of solids within that reservoir could significantly degrade its efficiency.

In one contemplated embodiment of the invention, the circulating brine will be maintained with a stable dissolved solids content. Of course, a variable dissolved solids content is also contemplated. Where the system maintains the circulating brine with a stable dissolved solids content, if new brine is added to the system, which is needed where a brine desalination or distillation facility is incorporated into the system, it may be necessary to supplement the dissolved solids content of the newly-added brine so that the overall dissolved solids content of the circulating fluid remains substantially constant. In such a case, the waste brine may be used to increase the dissolved solids content of the newly added brine, thereby reducing the amount of waste brine.

It is expected that certain concentrations of dissolved solids may have heat carrying advantages superior to other concentrations. In addition, it is expected that certain concentrations of dissolved solids will provide additional benefits depending upon the type of utilization facility connected to the system. For example, one type of electric generation facility may operate more efficiently than a different type of electric generation facility depending on the concentration of the dissolved solids. Where different types of utilization facilities (e.g., an electric generation facility and a brine desalination facility) are combined together, the concentration of the dissolved solids may be adjusted to accommodate the needs of the different types of utilization facilities and maximize the performance of the overall system.

One intended aspect of the present invention is to convert a hazardous waste, such as oil field brines, into a valuable commodity such as potable drinking water. Of course, as discussed above, a primary aspect of the present invention is to rely on the use of oil field brines as a thermal absorption medium for the production of electricity. It is expected that, initially, the system will be able to accommodate a significant amount of disposal brine. However, once the reservoir 5 is charged, it is not expected that the system will require significant amounts of additional disposal brine. Instead, it is contemplated that the additional disposal of brine will only be needed to maintain the level of brine being circulated through the system or to replace brine converted to fresh water.

Concerning the construction of the reservoir 5, the reservoir 5 may have any suitable internal geometry. Moreover, the reservoir 5 may be located in any suitable rock formation. As mentioned, however, the reservoir 5 preferably is of sedimentary rock including, but not limited to, a rock formation associated with the production of oil or gas, whether depleted or not. The thermally-charged brine passes through the permeable strata, charging the rock strata formation with heat until an equilibrium is reached between the temperature of the injected brine and that of the strata. Initially, heat loss into the surrounding reservoir rock during the injection phase will incrementally reduce the temperature. Typically, a loss of several hundred degrees C. is to be expected initially, especially several thousand feet away from the injection well bore 4. As the live steam front moves through the reservoir 5, a temperature equilibrium is established, resulting in a stable thermal geometry throughout the reservoir 5.

In addition, as the steam front moves through the reservoir 5, the steam front preferably effectively cleans the reservoir 5 of remaining hydrocarbons. Since hydrocarbons are removed from the rock strata, extraction sites may be established at one or more locations to establish one or more secondary or tertiary hydrocarbon recovery sites. Of course, the same extraction sites also may be used to extract the thermal energy from the steam front for power generation. Alternatively, the extraction sites may be used for water distillation, such as brine desalination or distillation, as indicated. Over time, as the heat reservoir 5 is maintained, the temperature differential across the reservoir 5 will decline, as solar energy is thermally stored and the synthetic geothermal reservoir bed's temperature equalizes. Eventually, as the reservoir 5 becomes heated, a relatively homogeneous temperature is maintained throughout the reservoir.

The ultimate temperature of the primary circulating fluid is controlled both by varying the production of the CSP and by controlling the circulation rate of the fluid. In the case of an oil field, as the supercritical steam moves through the reservoir 5, it decreases the viscosity of the residual oil and reduces capillary pressures holding the oil within pores in the rock strata. By reducing the viscosity of the oil, the oil may be more easily recovered. The steam front drives otherwise non-producible hydrocarbons through the reservoir 5 to the extraction well bore 6.

As noted above, the present invention may be thermally tuned to temperatures which will break bonds within the hydrocarbons, reducing complex chain and ring molecules to smaller and more mobile chains, effectively refining the petroleum in the reservoir 5 before extraction. In the process, ultimate hydrocarbon recovery will be enhanced by heat-induced decrease in oil viscosity, heat-induced reduction of capillary forces holding otherwise non-producible oil within small diameter pores, and thermal fracturing of long chain and ring hydrocarbon molecules into smaller, more mobile chain molecules. In the case of in situ hydrocarbon fracturing, it is expected that the octane ratio of the produced liquids will be increased. As a result of increased octane content, the per barrel value of the produced liquid hydrocarbons is proportionately increased.

As discussed above, the hydrocarbons are pushed by the steam front to an extraction well or wells 6. The brine and hydrocarbon mixture exits through the extraction well 6 at which point the fluid is pumped or forced to the surface. Pumping requirements depend upon the pressure maintained in the reservoir 5. At the extraction well head(s) 6, hydrocarbons are removed from the brine stream through standard separator technology 13. Extracted hydrocarbon liquids are diverted to one or more oil storage tank(s) 14 and either trucked or transported, via a pipeline 15, to market. Once the reservoir 5 has been depleted of hydrocarbons, the brine will circulate essentially free of such hydrocarbons and hydrocarbon extractors 13 no longer will be needed to be connected to the hydrocarbon-depleted reservoir 5.

For a reservoir 5 not yet depleted of hydrocarbons, the flow of the brine proceeds as follows. The separated brine is piped through the insulated brine feed pipe 16, which runs from the hydrocarbon separator 13 to heat exchange complex 17 and back to the parabolic trough 3. There, it is thermally recharged and re-injected into the reservoir 5. At night, the parabolic troughs 3 or other CSP sources are bypassed and the brines are directly injected back into the reservoir 5. As would be appreciated by those skilled in the art, this flow pattern is exemplary of one contemplated process flow. Other process flows, which will be appreciated by those skilled in the art, are intended to fall within the scope of the present invention.

Figure 2:
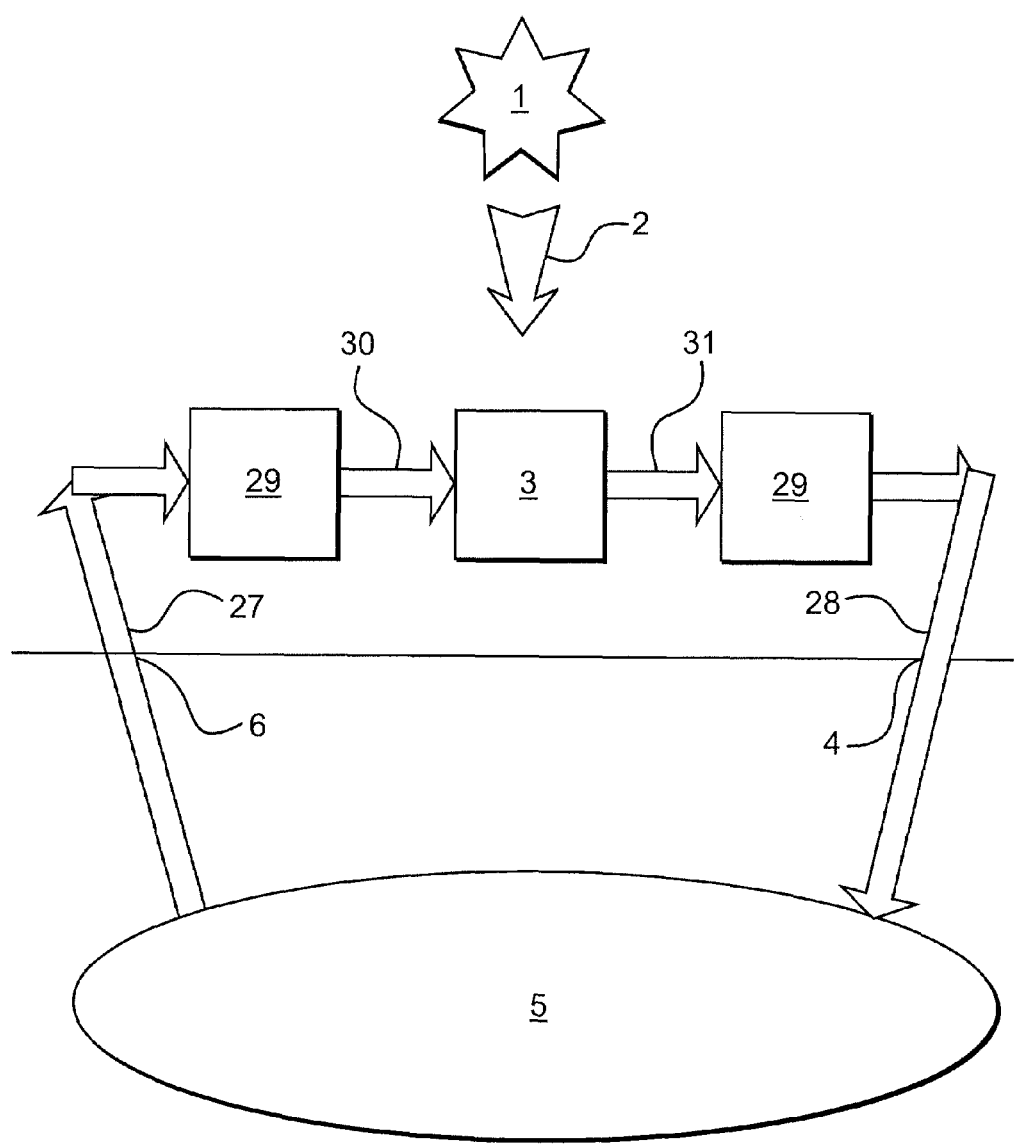
FIG. 2 is a schematic flow diagram illustrating one embodiment of the present invention.

FIG. 2 provides a schematic flow diagram of one embodiment of the present invention. As illustrated in FIG. 2, the reservoir 5 includes an injection well 4 and an extraction well 6. The extraction well 6 is connected to inlet piping 27 which extends from the extraction well 6 to a utilization facility 29, which may be a hydrocarbon extraction unit 13. Piping 30 connects the utilization unit 29 to a solar energy collector 3, which concentrates the energy 2 from the sun 1. Piping 31 connects the solar energy collector 3 to a second utilization unit 29, which may be a power plant 19. Outlet piping 28 extends from the second utilization unit 29 to the injection well 4, which is connected to the reservoir 5.

FIG. 2 also shows a simplified flow of the fluid from the reservoir 5 through the first utilization unit 29, the solar collector 3, and the second utilization unit 29, before it is returned to the reservoir 5, completing the operational circuit. The term "utilization unit" is intended to refer to any one of the different units that may be added to the inlet piping or the outlet piping 28, as desired. The fluid from the reservoir 5 is heated, preferably forming a supercritical fluid, before it is returned to the reservoir 5.

During the early phases of the operation of the present invention, electrical power is generated during daylight hours by running brine through the solar troughs 3 and from there, through the insulated pipes 18 to the heat exchanger 17 of a binary cycle electric generation facility (i.e., a geothermal plant) or other suitable power generation device. At the heat exchanger 17, binary working fluid (ammonia, isopentane or isobutane) is raised above flash point to a gaseous state equivalent to steam. From the heat exchanger 17, the binary operating gas drives one or more turbine(s) of a conventional binary cycle geothermal plant 19, which in turn drives an alternating current generator(s). Flash or double flash geothermal technology can also be utilized. This produces electrical power for the facility needs of the present invention and, when the power production exceeds the needs of the particular facility, the excess may be sold to the power grid for consumer use. The excess power is sent from the facility by way of high tension power lines 20. From the turbine(s), the binary working fluid is piped to condensation/cooling towers where it is re-liquefied. It is then piped to holding tanks for recycling.

The operating brine also may be cycled from the heat exchanger 17 to a brine storage and pump facility 21. From there, it is recycled back to the solar troughs 3, where it is again heated and re-injected into an injection well site 4. In the process of the present invention, the brine flow is essentially contained in a closed loop. FIG. 1 illustrates two injection wells 4 and two extraction wells 6 in the tertiary oil recovery mode. In most instances, there will be a field dependent pattern of multiple injection sites 4 to multiple extraction wells 6.

Power generated by the facility of the present invention may be utilized in the electrolysis of a portion of the brine (high electrolyte value) into elemental hydrogen and oxygen at an electrolysis facility 22. The captured gases are piped off to separate hydrogen storage and oxygen storage tanks. Those gases are subsequently piped, through a pipeline 23, possibly along existing natural gas or other rights of way. Where available, the existing natural gas rights of way offer a ready infrastructure to transport this renewable fuel to existing markets or to hydrogen and oxygen recombinant chambers. In the case where recombinant chambers are used, the combustion of the two gases drives conventional turbines, producing no nitrous or nitric oxides. The only waste byproduct is elementally-pure water.

One additional aspect of the present invention that results from the creation of hydrogen and oxygen is that these gases may be transported to remote locations where they are recombined. As a result, the energy "stored" in the gases may be retained by those gases until they are combusted at the remote location. In still another contemplated embodiment where the gases are supplied for consumer use, it is contemplated that the gases may be used as a vehicle fuel source, for those vehicle equipped to burn these gases.

During the night or during low periods of sunlight (overcast or low sun days in higher latitudes) the parabolic troughs are bypassed, and the system of the present invention relies on the stored energy within the reservoir 5. Utilizing either the solar troughs 3 directly, or synthetic geothermal energy of the present invention, a portion of the brine stream may be routed to a desalination/distillation flash tank(s) 24 and from there to fresh water condensation and storage tank(s) facility 25, where water in the 80 to 120 parts per million (ppm) range is captured for sale. The water is then piped to commercial markets via a pipeline 26. The potential for supplying a significant amount of new fresh water reserves to arid or water supply stressed areas of the United Sates is considered a significant aspect of the process of the present invention. While brine disposal potential is reduced within a secondary or tertiary oil recovery configuration as the reservoir 5 becomes charged, this is not the case in a desalination configuration, as disposal or specifically trapped formation brines will be needed to replace the fresh water extraction volumes.

A problem with present geothermal sites is the over production of thermal energy. If the heat removed exceeds the heat flow through the igneous or metamorphic rock, to the extraction site, the efficiency of the site decreases. This is particularly problematic in hot dry rock technology where heat is extracted along limited induced fracture surfaces, readily depleted in the heat balance equation.

The present invention may be employed with existing geothermal facilities to augment the production of energy from those geothermal facilities by capturing solar energy and storing or "banking" that energy for later recovery. The addition of solar heat to the geothermal reservoir reduces the potential for thermal exhaustion of the geothermal source and, for this reason, offers advantages to geothermal power generating stations. As noted, the thermal reserves in the subsurface geothermal reservoir are controlled through surface monitoring and management of the subsurface thermal budget. Accordingly, the process of the present invention may be used in the following manners: Enhanced Oil Recovery (only), Brine Desalination/Distillation (only), Geothermal Power Generation (only) or multiple modules achieving any desired combination(s) of these modes of operation, among others. Other uses for the SAGE supercritical brine heat source have been identified above and can be incorporated within the production stream.

In each of the different configurations contemplated for use wit the present invention, the system provides a means of controlling and disposing of oil field waste brines. An amount of supercritical fluid sufficient to achieve an appropriate level of reservoir pressurization and then sufficient to establish and maintain reservoir circulation through a closed-loop system is pumped down at least one injection well 4 into the reservoir 5 (oil or gas productive strata with established permeability and porosity, as well as stratigraphic/structural defined confinement geometry).

Depending upon what demands are made on the fluid circulation system at the surface, a hydrostatic head built up within the reservoir 5, the injection well site 4, the extraction well site 6, keeps the fluid circulating, preferably with minimal pumping assistance.

For example, where the supercritical fluid is circulated in a closed loop to and from the reservoir 5, as is described for a binary power generating system, the supercritical fluid is circulated with minimal need for additional pumping. With the exception of very minor losses of pressure through surface heat exchangers used to transfer heat to binary cycle working fluids, the pressure of the supercritical fluid removed from the reservoir should be equal to the injection pressure for the supercritical injection brines.

In the secondary or tertiary recovery mode of the proposed invention, entrainment of hydrocarbons will reduce composite fluid density at the extraction point 6, further reducing pump load. In this embodiment, pumping assistance will be required for re-injection at the surface, to maintain injection rates. In a typical secondary or tertiary recovery configuration, in accordance with the invention, additional disposal of naturally produced brines will augment the system, compensating for fluid lost to the reservoir 5 formation strata or through other losses. Once the system has been pressurized, little loss is anticipated.

Of course, as already noted, if freshwater distillation is incorporated into the process of the present invention, additional brine will need to be supplied to the system to compensate for the removal of water from the system. The residual brine residue from the distillation process may be circulated into porous and permeable strata not targeted for thermal storage. Alternatively, the brine waste may be mixed with disposal brine or naturally produced brines, prior to re-injection into the reservoir 5.

Where waste brine is mixed with other brine before injection into the reservoir 5, it is expected that the risks associated with the build-up of solids in the brine will be reduced, thereby reducing the risk of a system failure. This is expected to increase the useable lifetime of the facility, in some cases significantly. If the waste brine is not diluted before being injected into the reservoir 5, the reservoir 5 will eventually become supersaturated and solids will plug off the porosity, reduce permeability, and eventually render the site inoperable without remedial maintenance.

Surface conduits utilizing insulated pipe or casing of a kind and configuration know in the art are used to convey the heated supercritical fluid to the injection well(s) 4 and from the extraction well head(s) 6.

In addition to the different surface processing facilities previously mentioned, it is also contemplated that the brine circulated from the reservoir 5 may be used as a heat source for other applications. Contemplated applications include, but are not limited to, space heating, preheating materials for chemical processes, drying pumice and minerals mined in a way that produces wet products, heating greenhouses, drying of crops and wood pulp, heating water, and for any other direct heat application which can practically utilize hot fluid. The permutations on the use of the stored solar energy in the reservoir 5 are unlimited, as would be appreciated by those skilled in the art.

Presently, there are at least two different operational geothermal power plant types which are contemplated for use as electrical power generators in connection with the present invention. First, conventional binary cycle turbine power generators, such as binary cycle geothermal power plants, may be employed, as discussed above. Second, the brine may be flashed to steam from the supercritical fluid to drive a turbine directly. In the first instance, a binary heat transfer system method may achieve superior thermodynamic efficiency (approximately a factor of 3) by comparison with the direct expansion turbine method. In the binary system, isobutane, isopentane, a halogenated hydrocarbon refrigerant, liquid ammonia, or another suitable binary-cycle working fluid is circulated through a heat exchange system where it is heated by the supercritical brine from the reservoir 5. The heated binary cycle working fluid is flashed to provide gas expansion to drive the turbine. The binary working fluid is subsequently circulated through a cooling tower, where is condenses to a liquid. The liquid phase binary cycle working fluid is pumped back into the heat exchanger where it is once again heated and vaporized by the circulating brines. Both the binary working fluid cycle and the circulating thermal brine cycle are closed loop systems, resulting in no pollution, reduced scale problems, and high plant efficiency.

In a second approach, the hot circulating brine fluid from the production well bore 6 is expanded in a flash chamber. The steam drives an electrical generation steam turbine, such as a geothermal steam turbine. In the power generating turbine, the live steam expands isentropically to a lower temperature and pressure. The flashed steam is subsequently condensed as extremely pure fresh water (80-120 parts per million (ppm)), which may be used for agricultural, industrial, or human consumption purposes.

A small (323,750 square meter (80 acre)) three well configuration consisting of one injection well 4 and two extraction wells 6 is calculated as being able to produce more than 1,892,700 liters (500,000 gallons) of potable water per day. A small 3 square mile field potentially could generate about 45,425,000 liters (12 million gallons) of potable water each day.

Because of the dissolved solids in the brine stream, the residual brine must be cycled out of the flash chamber and, for maximum field life, returned to other permeable and porous subsurface strata above and/or below the thermal reservoir 5.

In flash electrical power generation and in water desalination/distillation configurations of the present invention, scale/residual dissolved solids problems similar to those encountered and overcome at the geothermal facilities at the Salton Sea geothermal field in California, will be encountered. The Salton Sea extraction wells produce hot brine containing up to 160,000 parts per million (ppm) of dissolved solids, chiefly Cl, Na, K, Ca and Fe. The geothermal industry has developed technologies to handle these problems and the oil industry has long handled scale problems with these and other compound scales (notably gypsum ($CaSO_4$-$2H_2O$) and calcium carbonate ($CaCO_3$)) for many years. It should be noted that the Salton Sea brines also contain trace amounts of copper, beryllium, arsenic, lead cadmium, mercury, and other trace elements common to igneous and metamorphic terrains. These heavy metals are not encountered in most of the oil and gas fields of the world, as the trap rock is sedimentary, not igneous or metamorphic strata.

It will be necessary in either of the two power generation scenarios using the present invention to recycle the supercritical fluid from the power generation plant, back down the injection well or wells 4 in a closed-loop system. This conserves the primary brine (and its pressure in the binary cycle mode) and complies with Federal and State legal environmental requirements for the disposal of oil field brines.

The engineered thermal reservoirs 5 of this invention have other advantages over standard geothermal reservoirs. The fields relied upon to create the reservoirs 5 of the present invention have proven and numerically established permeability and porosity. The reservoir geometries are also well established. This allows for accurate modeling and management of the reservoirs 5 of the present invention. In contrast, limited permeability, particularly as found in the restricted fractures developed in hot dry rock (HDR) geothermal energy stations, places severe restrictions on the rate of economic thermal extraction.

It is noted that the largest geothermal field in existence, the Geysers in California, is 38,849,820 meters square (15 miles square). In contrast, many of the potential fields in the oil provinces of the United States and the world that are contemplated for use as reservoirs 5 according to the teachings of the present invention are in an order of magnitude greater in size. Accordingly, their power generating capacity is proportionately greater. It is calculated that by relying on existing hydrocarbon fields, the present invention may expand the application of solar and geothermal power production by a factor of 4 in the United States alone.

The present invention offers the oil industry a cost effective and readily available source of high temperature steam, significantly improving secondary and tertiary recover of hydrocarbons, while converting depleted wells, now a costly plugging liability, to a commercial asset. At the same time, the present invention offers a new market for oil field brines, now considered a disposal problem.

The modular flexibility of the system of the present invention potentially provides freshwater, now a threshold parameter to the development and growth of the southwest United States and other arid areas of the nation and the world.

Electrolysis of brines will provide a clean source of hydrogen and oxygen for transportable energy.

Solar energy suffers from limitations of sunlight availability. The present invention effectively stores that energy in artificial (synthetic) geothermal reservoirs for subsequent and uninterrupted use at night, during intervals of cloud cover, and at higher latitudes, during the winter months when daylight is diminished and limited.

The present invention offers an environmentally friendly source of renewable energy and energy storage, which may significantly reduce oil demand. Domestic oil production reached its zenith in 1970 and has been steadily declining since. Texas, the leader in domestic hydrocarbons, is now producing oil at the same rate as in the early 1930s. World wide peak production is no more than a decade away. When that peak in production is reached, it will not mean that oil has run out but rather that each day there will be less oil on the market, at a time of continued world industrial growth. At a 5% decline (conservative), each day there will be 10,000 barrels per day less production than the previous day.

The present invention provides a method to harness a continuous source of solar and geothermal energy at a crucial time, substantially enhancing our nation's security and economic well-being.

The following examples will demonstrate the operability of the invention.

EXAMPLE 1

In a constructive reduction to practice using data from an analogous solar energy production system, the present invention utilizes subsurface storage of solar energy in porous and permeable strata. The present invention utilizes established permeability and porosity in existing and depleted oil and gas fields, along with their hydrocarbon trapping geometries and in place well bores.

In the hydrocarbon reservoir strata of the Permian Basin of West Texas, permeability ranges from 2 to over 600 millidarcies. Average porosity ranges from 5 to 21%. Water saturations, which is an indication of available oil field brines, range from 25 to 61%. It should be noted that many of the hydrocarbon reservoirs of the Permian Basin are water driven with flank wells being plugged (or capped, i.e., taken out of production) when the water fraction in the effluent from the wells exceed 95%. Many dry holes have been plugged after 100% water effluent was obtained from these permeable and porous strata.

In the secondary or tertiary configuration of the present invention, there will be first a selection of an injector well pattern and an extractor well pattern. Wells will be selected based on location, casing condition, and casing size. The selected wells will then be lined with an insulated casing and/or liner. A casing shoe seals the thermal liner above the pay section for the well. The existing perforations or slots in the original casing can be either utilized or re-perforated to maximize flow rates. In the case of an original open hole completion, a packer will be placed above the open hole and the reservoir thermally charged directly through the open well bore. Prior to thermal injection, the well bores can be acid stimulated and/or fractured, depending on the individual well's prior production history and performance.

A Concentrating Solar Power (CSP) field may be built depending on the configuration desired for use of the present invention. The injection wells 4 of the system are then charged with solar heated supercritical brines, heated to the desired temperature, depending upon hydrocarbon fracturing or other requirements.

The superheated fluid is then pumped into the reservoir 5 through the injector wells 4, effectively steam cleaning the reservoir 5 and pushing a resultant oil brine mixture to the extraction well sites 6. Initially, secondary recovery extraction well rates will be on the order of several hundred to a few thousand barrels of water and residual oil per day. Once converted to binary power generation, extraction rates will be on the order of 1,589,900 liters (10,000 barrels) (420,000 gallons) per day per MW of generating capacity, for a system delivering 160° C. fluid. Higher temperature reservoirs 5 will require a lower volume of flow.

The oil is separated with conventional methods and the brine is returned to the CSP. At a predetermined point in the secondary or tertiary program, or separate from it, the reservoir 5 is converted to a source of artificially enhanced geothermal heat for power generation, water distillation, or other geothermal energy utilization. Other variations are described herein and will be appreciated by those skilled in the art.

Injection rates, length of time necessary to charge the reservoir 5, extraction rates and other parameters of the present invention are field specific. Each project will required pre-planning to maximize efficiency.

EXAMPLE II

In a constructive reduction to practice, the present invention is applied to a depleted gas field for immediate development of electrical power, water distillation, and/or other traditional geothermal energy uses.

On a project by project basis, individual wells may be selected for injection, extraction, or abandonment (plugging of wells deemed unfit for conversion, in order to maintain reservoir pressure and flow integrity). Those wells deemed unfit for conversion may be plugged at lower depths and converted to brine source wells from brine bearing strata well above the targeted thermal reservoir 5.

The system is then charged with oil field disposal brines and/or natural subsurface brines produced from zones above and/or below the reservoir 5. It should be noted here that many deep depleted gas fields in the United States already have a significant geothermal reserve, bottom hold temperatures often exceeding 150° C. This will assist the efficiency of the present invention, although it is not paramount.

A Concentrating Solar Power (CSP) facility may be built near the injector wells 4 and the desired energy utilization modules constructed. The reservoir 5 is then charged and the system placed on line. A three well pattern of two injector sites 4 and one extractor well 6 can run a 5 MW binary facility, produce more than 1,892,700 liters (500,000 gallons) of potable water per day, or a combination of the two. Other geothermal energy uses may also be incorporated, as needed.

EXAMPLE III

The present invention can be applied to non-producing regions or structural traps which have proven non-productive. These projects will carry a risk associated with limited data and the costs of drilling wells specifically for injection and extraction, rather than converting existing wells. These sites provide the advantage of having the potential to employ the teachings of the present invention, including both establishment of drilling pattern and borehole design tailored to synthetic geothermal injection and extraction.

It should be noted here that drilling of wells in sedimentary basins is significantly less costly, by a factor of 4, than the drilling of comparable depth wells in a traditional igneous or metamorphic geothermal terrain.

It is anticipated that initial implementation of the present invention will be undertaken utilizing existing oil and gas fields, depleting or depleted. That development will establish the economic parameters necessary to commercially or economically expand projects into areas or structures not exploited for oil and gas.

In the above examples, a number of conditions will need to be determined, prior to project construction. Most of these are already known for producing or abandoned oil and/or gas fields (Examples I and II). They include:

(a) The local solar budget necessary to construct the appropriate Concentrating Solar Power (CSP) field;

(b) The target reservoir depth—while it is possible to utilize reservoir rock above 304.8 meters (1,000 feet) below ground surface, reservoir pressures are best maintained by naturally occurring rock overburden (production reservoir depth being a matter of record);

(c) The porosity (pore volume) of the reservoir—this is known for most fields and can be determined from sonic logs, compensated neutron-formation density logs, cores, or a number of other sources already in place;

(d) The permeability (the ability of a fluid to flow through the pores) of the strata—again, this is a known, through production histories and core analysis available for most reservoirs;

(e) The water saturation (the amount of water contained within the pores; the remainder being hydrocarbons) of the strata—log analysis and core information has established this for most fields;

(f) The reservoir lithology—this is a known established from well cuttings, core and electric log analysis (It will be important to analyze cuttings for potential scaling problems or other constraints on thermal injection levels.);

(g) The oil type—in the secondary or tertiary configuration of the system of the present invention, the cracking potential of the supercritical steam may be tailored to the specific oil type and thermal windows most conducive to optimum end product generation must be set; and (h) The field geometry—again, this is generally a known, established by existing seismic data and well control and will aid project modeling for maximum recovery efficiency, establish brine charging volumes, and establish optimum flow rates.

Based on the wealth of field production and development data already available, systems developed in accordance with the present invention may be modeled with a high degree of accuracy, prior to project implementation.

INDUSTRIAL APPLICABILITY

The method and apparatus of the present invention may be used for storing solar energy in artificial (synthetic) geothermal reservoirs. The system will assist the oil industry in exploiting now non-producing reserves of hydrocarbons and in converting depleted assets and future financial liabilities to economically productive renewable assets.

Practice of the invention also provides a means for sequestration of produced oil field brines. The present invention will increase the target areas of geothermal industry by a factor of 4, opening up significant new areas to that industry.

The present invention will provide a major new source of fresh water for arid and water stressed regions of the united states and the world, developing a new industry in water supply.

The electrolysis module of the system of the present invention will create a new source of hydrogen (as well as oxygen) and create a vector to transport energy to markets beyond the solar augmented geothermal energy (sage) electrical transmission grid limit which is expected to be about 1,126,500 meters (700 miles)).

What is claimed is:

1. A method for storage of solar energy in a subsurface geologic reservoir, comprising:
    transferring concentrated solar thermal energy to a brine, thereby generating a supercritical brine; and
    injecting the supercritical brine into the subsurface geologic reservoir through at least one injection well, the subsurface geologic reservoir comprising at least one geological formation selected from a group comprising highly permeable and porous sedimentary strata, a depleted hydrocarbon field, a depleting hydrocarbon field, a depleted oil field, a depleting oil field, a depleted gas field, and a depleting gas field, thereby forming a synthetic geothermal reservoir.

2. The method of claim 1, wherein the brine is selected from a group comprising a waste brine produced from an oil field, a waste brine produced from a gas field, and a naturally-occurring brine.

3. The method of claim 2, wherein the brine comprises dissolved solids with a concentration of between about 10,000 and 240,000 parts per million.

4. The method of claim 1, wherein, where the geothermal reservoir is a depleted oil field or a depleting oil field, the geothermal reservoir is located at a depth between about 304.8 meters (1,000 feet) to 4,876.8 meters (16,000 feet).

5. The method of claim 1, wherein, where the geothermal reservoir is a depleted gas field or a depleting gas field, the geothermal reservoir is located at a depth of at least about 4,267.2 meters (14,000 feet).

6. The method of claim 2, wherein a temperature of the supercritical brine is less than about 1000° C.

7. The method of claim 6, wherein the temperature of the supercritical brine is between about 120° C. and 1000° C.

8. The method of claim 7, wherein the temperature of the supercritical brine is about 400° C.

9. The method of claim 1, wherein the at least one injection well is a well bore previously drilled into the subsurface geologic formation.

10. The method of claim 1, further comprising:
    extracting the supercritical brine from subsurface geologic reservoir through at least one existing extraction well bore.

11. The method of claim 1, wherein the supercritical brine is injected at a pressure in a range from approximately 3.4 MPa (500 pounds per square inch (psi)) to about 58.6 MPa (8,500 psi).

12. The method of claim 1, wherein the supercritical brine is injected at a rate in a range between about 16,000 liters per day and 3,180,000 liters per day, per injection well.

13. The method of claim 10, wherein the supercritical brine is extracted at a rate between about 16,000 liters per day and 3,180,000 liters per day, per extraction well.

14. A method for storage of solar energy in a subsurface geologic reservoir for utilization at a utilization facility, comprising:
    transferring concentrated solar thermal energy to a brine, thereby generating a supercritical brine;

injecting the supercritical brine into the subsurface geologic reservoir through at least one injection well, thereby forming a synthetic geothermal reservoir;

extracting the supercritical brine from the subsurface geologic reservoir through at least one extraction well; and piping the extracted supercritical brine to the utilization facility.

15. The method of claim 14, wherein the utilization facility flashes the supercritical brine into steam to produce fresh water with a dissolved solids content of between about 60 parts per million (ppm) and 200 parts per million (ppm).

16. The method of claim 14, wherein the utilization facility generates electricity.

17. The method of claim 16, wherein electricity is generated by transferring heat from the supercritical brine to a second fluid that is expanded to turn a power generating turbine.

18. The method of claim 16, wherein the supercritical fluid is flashed into steam to turn a power generating turbine.

19. The method of claim 14, wherein the utilization facility electrolyzes the supercritical brine into elemental oxygen and hydrogen.

20. The method of claim 15, wherein, after the supercritical brine is flash distilled, residual hyper-saline fluid is circulated back into an underground reservoir other than the subsurface geologic thermal storage reservoir.

21. The method of claim 14, wherein the supercritical fluid is conducted to and from the subsurface geologic reservoir by at least one of pressure flow, thermal expansion, pumping, or thermal siphoning.

22. A method for utilizing solar energy to extract hydrocarbons from a subsurface geologic reservoir and for storing solar energy in the subsurface geologic reservoir, comprising:

transferring concentrated solar thermal energy to a brine, thereby generating a supercritical brine with a predetermined temperature;

injecting the supercritical brine into the subsurface geologic reservoir through at least one injection well, thereby forming a synthetic geothermal reservoir;

raising the temperature of hydrocarbons within the subsurface geologic reservoir to the predetermined temperature to decrease viscosity of the hydrocarbons, reduce capillary attachment of the hydrocarbons to an interior of the subsurface geologic reservoir, and extract the hydrocarbons from the interior of the subsurface geologic reservoir;

extracting the supercritical brine containing the extracted hydrocarbons from the subsurface geologic reservoir through at least one extraction well;

piping the extracted supercritical brine to the utilization facility.

23. The method of claim 22, wherein the temperature of the hydrocarbons is raised such that the hydrocarbons are fractioned into hydrocarbons of smaller molecular weight.

24. An apparatus for storage of solar energy, comprising:

a solar collector adapted to transfer concentrated solar thermal energy to a brine;

a subsurface geologic reservoir comprising at least one geological formation selected from a group comprising highly permeable and porous sedimentary strata, a depleted hydrocarbon field, a depleting hydrocarbon field, a depleted oil field, a depleting oil field, a depleted gas field, and a depleting gas field;

an injection well extending to the subsurface geologic reservoir, establishing an inlet to the subsurface geologic reservoir;

an extraction well extending to the subsurface geologic reservoir, establishing an outlet from the subsurface geologic reservoir;

first piping extending from the extraction well to an inlet of the solar collector; and second piping extending from an outlet of the solar collector to the injection well, wherein brine is drawn through the first piping to the solar collector where the brine is heated, thereby creating a supercritical brine, which is injected back into the subsurface geologic reservoir through the second piping.

25. The apparatus of claim 24, wherein the brine is selected from a group comprising a waste brine produced from an oil field, a waste brine produced from a gas field, and a naturally-occurring brine.

26. The apparatus of claim 25, wherein the brine comprises dissolved solids with a concentration of between about 10,000 and 240,000 parts per million.

27. The apparatus of claim 24, wherein, where the subsurface geologic reservoir is a depleted oil field or a depleting oil field, the subsurface geologic reservoir is located at a depth between about 304.8 meters (1,000 feet) to 4,876.8 meters (16,000 feet).

28. The apparatus of claim 24, wherein, where the subsurface geologic reservoir is a depleted gas field or a depleting gas field, the subsurface geologic reservoir is located at a depth of at least about 4,267.2 meters (14,000 feet).

29. The apparatus of claim 25, wherein the solar collector raises a temperature of the supercritical brine to less than about 1000° C.

30. The apparatus of claim 29, wherein the solar collector raises the temperature of the supercritical brine to between about 120° C. and 1000° C.

31. The apparatus of claim 30, wherein the solar collector raises the temperature of the supercritical brine to about 400° C.

32. The apparatus of claim 24, further comprising:

at least one pump to inject the supercritical brine into the subsurface geologic reservoir at a pressure in a range from approximately 3.4 MPa (500 pounds per square inch (psi)) to about 58.6 MPa (8,500 psi).

33. The apparatus of claim 24, further comprising:

at least one pump to inject the supercritical brine into the subsurface geologic reservoir at a rate in a range between about 16,000 liters per day and 3,180,000 liters per day, per injection well.

34. The apparatus of claim 24, further comprising:

at least one pump to extract the brine from the subsurface geologic reservoir at a rate between about 16,000 liters per day and 3,180,000 liters per day, per extraction well.

35. The apparatus of claim 24, further comprising:

a utilization facility disposed along at least one of the first piping and the second piping.

36. The apparatus of claim 35, wherein the utilization facility flashes the supercritical brine into steam to produce fresh water with a dissolved solids content of between about 60 parts per million (ppm) and 200 parts per million (ppm).

37. The apparatus of claim 35, wherein the utilization facility generates electricity.

38. The apparatus of claim 37, wherein electricity is generated by transferring heat from the supercritical brine to a second fluid that is expanded to turn a power generating turbine.

39. The apparatus of claim 37, wherein the supercritical brine is flashed into steam to turn a power generating turbine.

40. The apparatus of claim 35, wherein the the utilization facility electrolyzes the supercritical brine into elemental oxygen and hydrogen.

41. The apparatus of claim 36, wherein, after the supercritical brine is flash distilled, residual hyper-saline fluid is circulated back into an underground reservoir other than the subsurface geologic reservoir.

42. The apparatus of claim 35, wherein the utilization facility extracts hydrocarbons from the brine.

* * * * *